Patented May 4, 1943

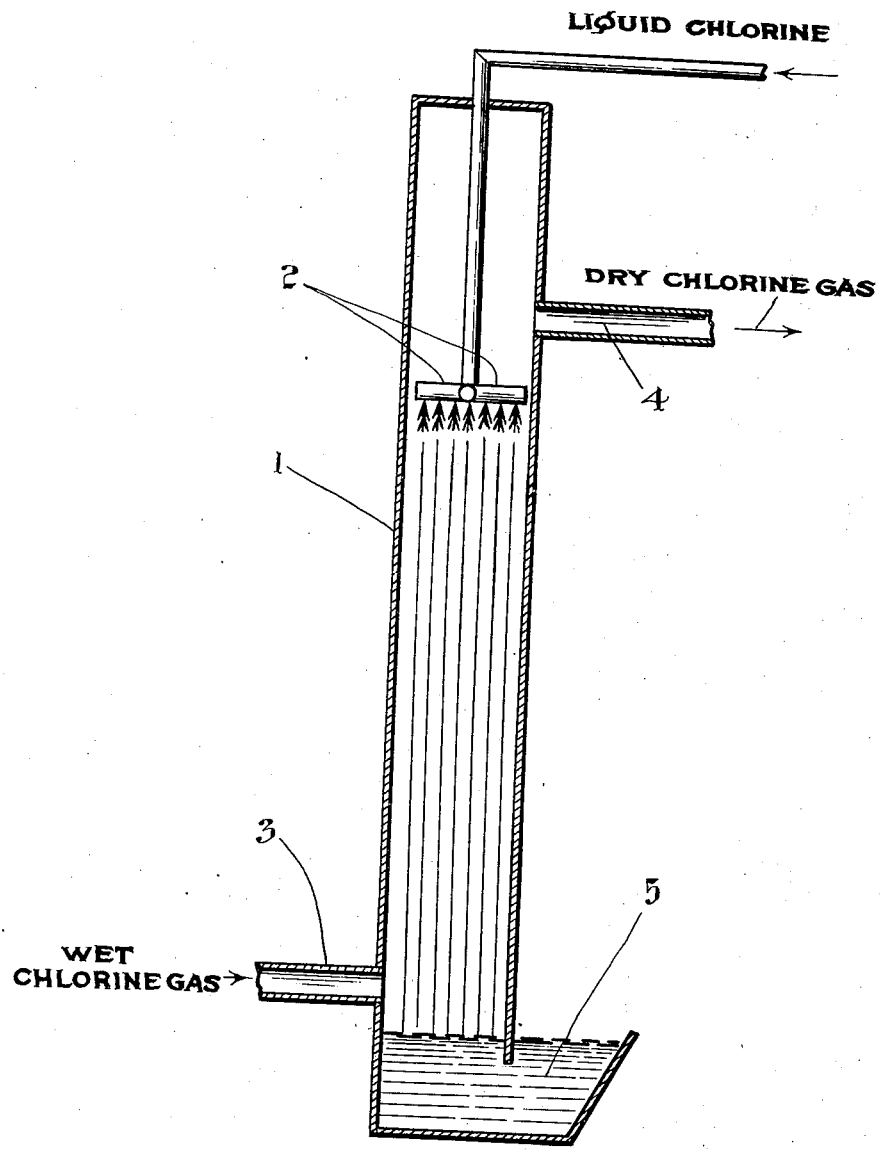

2,318,512

UNITED STATES PATENT OFFICE 2,318,512

PURIFICATION AND DRYING OF CHLORINE GAS

Ivan Roy McHaffie, Montreal, Quebec, Canada, assignor to Canadian Industries Limited, Montreal, Quebec, Canada, a corporation of the Dominion of Canada Application December 21, 1940, Serial No. 371,133 In Canada July 22, 1940

10 Claims. (Cl. 62—175.5)

This invention relates to the purification of chlorine gas and more particularly it relates to a method and apparatus for removing moisture and/or organic impurities from chlorine gas containing the same prior to liquefaction of the gas.

Chlorine for industrial purposes is usually stored and transported in liquid form in steel containers from which the gas may be vapourized as required. To provide chlorine which will not affect the interior of the container and which may be vapourized with assurance that the purity of the chlorine will be uniform and will not result in clogging of the container valves on vapourization, it is essential that the chlorine be free from both moisture and organic impurities prior to liquefaction and storage in the containers.

The usual process for producing chlorine gas by the electrolysis of a brine solution using graphite anodes results in a gas containing a relatively large proportion of moisture in addition to a small amount, usually less than 1% by weight, of various organic impurities such as chloroform, carbon tetrachloride and hexachlorethane. The removal of moisture has heretofore been accomplished by passing the gas through strong sulphuric acid but this treatment does not remove the organic impurities. A process heretofore proposed for the removal of organic impurities from chlorine gas comprises passing the gas through a scrubbing tower provided with a refrigerating coil whereby a portion of the gas is condensed to liquid chlorine to form a scrubbing liquid for the ascending gas. This method is, however, disadvantageous in that the amount of chlorine liquefied by the refrigerating coil fluctuates greatly not only with variations in the temperature of the coil but also with the rate of gas flow and with temperature, pressure and concentration of the gas. Hence, at times an insufficient amount of chlorine is liquefied in the tower to scrub out the impurities in the gas while at other times the tower may be flooded with liquid, thus obstructing the flow of gas therethrough. Such a process is not, therefore, readily adapted to a continuously operating commercial process. It has also been proposed to scrub a previously dried chlorine gas with liquid chlorine introduced into the tower from an outside source thereby to condense any organic impurities which are then removed by the scrubbing action of the liquid chlorine. It should be noted however, that in both the processes above described the gas must be dried previous to entry into the scrubbing tower. Both types of process are therefore subject to the disadvantage that a separate drying step must be introduced into the operating cycle.

An object of the present invention is to provide an economical method for the simultaneous removal of moisture and organic impurities from chlorine gas prior to liquefaction.

A further object is to provide a process for obtaining chlorine gas substantially free from moisture and/or organic impurities which process may be operated continuously and in which there is no loss of chlorine and no dilution of the final product by gaseous or other substances.

A still further object is to provide an apparatus suitable for the simultaneous removal from chlorine gas of moisture and organic impurities.

These objects are accomplished by the following invention which comprises subjecting moist chlorine gas as it comes from the electrolytic cells to the action of a spray of liquid chlorine. The gas is thus cooled to about −20° C. by the action of vapourizing liquid chlorine which results in condensation and separation of the water vapour as ice together with the simultaneous formation of quantities of chlorine hydrate. The scrubbing action of the liquid chlorine tends to remove the organic impurities by condensation but the larger proportion of the organic impurities are removed by absorption in the chlorine hydrate. In the process of my invention it is therefore essential that the chlorine gas to be treated contain a certain amount of moisture so that chlorine hydrate may be formed in the tower since, as described above, the chlorine hydrate must be present to serve as a medium for absorption of the organic impurities. The present invention therefore represents a distinct advance in the art in that both the drying step and the step of removing organic impurities are achieved in one operation.

The process may be carried out in an apparatus which is diagrammatically illustrated by the accompanying drawing wherein a suitable tower shown at 1 and lagged to prevent the access of heat as it operates at temperatures below atmospheric, is provided with suitable spray nozzles 2 in the upper portion of the tower through which pure liquid chlorine is sprayed. Wet chlorine gas as it comes from the electrolytic cells enters at the base of the tower through pipe 3, the gas passing upward through the spray of liquid chlorine where it is not only cooled by the vapourizing chlorine but is also to a certain extent scrubbed by the liquid chlorine. The dried and purified chlorine gas leaves the tower through exit pipe 4 which is connected with the liquefaction plant (not shown) while the condensed moisture is continuously removed from the apparatus through the water seal 5 at the base of the tower.

In a preferred example, an unpacked tower 20 feet high of suitable corrosion resistant material and of such cross-sectional area that the rate of throughput of chlorine gas is not more than 200 lbs./sq. ft. cross-sectional area/hour is equipped with sprays at a distance from the top of the tower equal to one third its total height. The sprays should be capable of projecting liquid chlorine in a fine even distribution in a downward direction across the entire cross-section of the tower and have a capacity of from 0.1 to 0.25 times the weight of the gaseous chlorine passing through the tower. The wet gas, the temperature of which varies from 20° C. representing winter conditions and 30° C. representing summer conditions, is passed into the tower and, on ascending, meets the spray of pure liquid chlorine and is thereby cooled to the desired temperature, preferably —20° C. depending on the ratio of liquid chlorine to chlorine gas used. The moisture separates from the gas stream as ice and chlorine hydrate in the space provided in the tower above the sprays. The ice and chlorine hydrate then settle down the tower as solids and, on coming into contact with the warmer chlorine gas entering at the base of the tower, the ice is converted into water while the chlorine hydrate which has absorbed organic impurities during its downward passage through the ascending chlorine gas, is decomposed to liberate chlorine gas and water. The water is continuously removed at the base of the tower through the water seal while the organic impurities which collect at the base can be drained off from time to time.

The following table illustrates the results obtained by the practice of my invention with respect to the removal of moisture from wet chlorine gas.

Table

| | | |
|---|---|---|
| Temperature of incoming wet chlorine gas....° C | 20 | 30 |
| Temperature of outgoing dry chlorine gas....° C | —20 | —20 |
| Ratio of liquid chlorine to gaseous chlorine | .15 | .22 |
| Weight of water vapour in incoming wet chlorine gas..........................kmgs./ton of gas | 4.51 | 11.15 |
| Weight of water vapour in outgoing dry chlorine gas.........................kgms./ton of gas | .254 | .254 |
| Water vapour removed.................do.... | 4.256 | 10.896 |

The efficiency with which impurities other than water are removed is shown by the following example:

*Example*

An analysis of a 100 cc. sample of moist chlorine gas from the electrolytic cells showed that it contained .22 cc. of liquid residue other than water of which residue 3.5 mgms. was identified as hexachlorethane. An analysis of the gas after drying with liquid chlorine showed that only .12 cc. of liquid residue per 100 cc. of gas remained of which .5 mgms. was hexachlorethane.

The process of my invention is thus efficient and economical as the liquid chlorine required for operation in the process is returned without loss to the liquefaction plant. Thus the only cost factor involved is the power consumed in the refrigeration unit to effect reliquefaction of the chlorine used for scrubbing and cooling purposes. With respect to the drying step, the process is much more economical than one involving the use of sulphuric acid as a drying agent while the combination of the drying step and the removal of organic impurities in the one operation results in a more efficient process than one requiring the removal of moisture prior to removal of organic impurities.

In the practice of this invention the use of an unpacked tower is preferred since, at a temperature below 9° C. and at one atmosphere pressure, the chlorine hydrate is formed as a solid which would, of course, block the packing in a packed tower and thus disrupt the efficiency of the process. With an unpacked tower the hydrate and ice formed fall freely through the tower until they meet the warmer inlet gas where the hydrate is decomposed and the ice melted.

While I have disclosed the preferred embodiments of my invention, the above description and example are intended to be illustrative only. Any modification of or variation therefrom which conforms to the spirit of the invention is intended to be included within the scope of the claims.

I claim:

1. The process of purifying moist chlorine gas which comprises passing said chlorine gas in counter-current flow to a contacting stream of pure liquid chlorine to cause condensation of the moisture present in said gas and separating the condensate from the purified gaseous chlorine.

2. The process of purifying moist chlorine gas containing organic impurities which comprises passing the moist, impure chlorine gas in counter-current flow to a contacting stream of pure liquid chlorine to cause the simultaneous condensation of the moisture and absorption of the organic impurities from the chlorine gas and separating said moisture and organic impurities from the purified gaseous chlorine.

3. The process of purifying moist chlorine gas containing organic impurities which comprises passing the moist, impure chlorine gas into a suitable tower at a point adjacent the base thereof, permitting the chlorine gas to ascend in the tower against a downward flow of contacting pure liquid chlorine which has been introduced into the upper portion of said tower thereby causing simultaneous condensation of the moisture and absorption of the organic impurities from the chlorine gas, and withdrawing the dried and purified gaseous chlorine from the tower at a point adjacent the top thereof.

4. The process of purifying moist chlorine gas containing organic impurities which comprises passing the moist, impure chlorine gas into a suitable tower at a point adjacent the base thereof, permitting the chlorine gas to ascend in the tower against a downward flow of contacting pure liquid chlorine which has been introduced into the upper portion of said tower thereby causing simultaneous condensation of the moisture and absorption of the organic impurities from the chlorine gas, removing the moisture and organic impurities from the base of said tower and withdrawing the dried and purified gaseous chlorine from the tower at a point adjacent the top thereof.

5. The process of purifying moist chlorine gas derived from the electrolysis of a brine solution which comprises passing the moist, impure chlorine gas into a suitable tower at a point adjacent the base thereof, permitting the chlorine gas to ascend in the tower against a downward flow of contacting pure liquid chlorine which has been introduced into the upper portion of said tower thereby causing simultaneous condensation of the moisture and absorption of the organic impurities from the chlorine gas, removing the moisture and organic impurities from the base of said tower and withdrawing the dried and purified gaseous chlorine from the tower at a point adjacent the top thereof.

6. The process of purifying moist chlorine gas containing less than 1% by weight of organic impurities which comprises passing the moist, impure chlorine gas into a suitable tower at a point adjacent the base thereof, permitting the chlorine gas to ascend against a downward flow of contacting pure liquid chlorine produced in a later step and introduced into the upper portion of said tower, thereby causing simultaneous separation of the moisture and organic impurities from the chlorine gas by condensation and absorption, removing the moisture and organic impurities from the base of said tower, withdrawing the dried and purified gaseous chlorine from the tower at a point adjacent the top thereof, liquefying the dried and purified chlorine gas so withdrawn and supplying the upper portion of said tower with pure liquid chlorine from that so liquefied.

7. In a process for the purification of moist chlorine gas the steps which comprise passing said chlorine gas in counter-current flow to a stream of contacting pure liquid chlorine to cause condensation of the moisture present in said gas and separating said condensed moisture from the purified gaseous chlorine.

8. In a process for the purification of moist chlorine gas derived from the electrolysis of a brine solution containing less than 1% by weight of organic impurities, the steps which comprise passing the moist, impure chlorine gas into a suitable tower at a point adjacent the base thereof, permitting the chlorine gas to ascend against a downward flow of contacting pure liquid chlorine produced in a later step and introduced into the upper portion of said tower, thereby causing simultaneous separation of the moisture and organic impurities from the chlorine gas by condensation and absorption, removing the moisture and organic impurities from the base of said tower, withdrawing the dried and purified gaseous chlorine from the tower at a point adjacent the top thereof, liquefying the dried and purified chlorine gas so withdrawn and supplying the upper portion of said tower with pure liquid chlorine from that so liquefied.

9. The process of drying chlorine gas and simultaneously removing organic impurities therefrom which consists in contacting impure chlorine gas with pure liquid chlorine in the presence of a substantial quantity of water vapour contained in or entrained by the gas and under conditions of temperature and pressure such that a proportion of said water vapour combines with chlorine to form a chlorine hydrate absorption medium for the absorption of organic impurities while the remainder of the water vapour separates from the gas.

10. The process of removing organic impurities from chlorine gas which comprises contacting the gas with liquid chlorine in the presence of a substantial quantity of water vapour and under conditions of temperature and pressure such that the water vapour combines with the liquid chlorine to form a chlorine hydrate absorption medium for the absorption of organic impurities from said gas.

IVAN ROY McHAFFIE.